US012320508B1

(12) United States Patent
Stout

(10) Patent No.: US 12,320,508 B1
(45) Date of Patent: Jun. 3, 2025

(54) DECORATIVE LIGHT FRAME DEVICE

(71) Applicant: Reynold Stout, St. George, UT (US)

(72) Inventor: Reynold Stout, St. George, UT (US)

( * ) Notice: Subject to any disclaimer, the term of this patent is extended or adjusted under 35 U.S.C. 154(b) by 0 days.

(21) Appl. No.: 18/910,542

(22) Filed: Oct. 9, 2024

Related U.S. Application Data

(63) Continuation-in-part of application No. 18/523,998, filed on Nov. 30, 2023, now Pat. No. 12,137,828.

(60) Provisional application No. 63/464,661, filed on May 8, 2023.

(51) Int. Cl.

| | |
|---|---|
| ***F21V 21/116*** | (2006.01) |
| ***F21S 4/10*** | (2016.01) |
| ***F21V 21/108*** | (2006.01) |
| ***F21Y 107/30*** | (2016.01) |

(52) U.S. Cl.
CPC .......... *F21V 21/116* (2013.01); *F21V 21/108* (2013.01); *F21S 4/10* (2016.01); *F21Y 2107/30* (2016.08)

(58) Field of Classification Search
CPC ............................ F21V 21/116; F21V 21/108
See application file for complete search history.

(56) References Cited

U.S. PATENT DOCUMENTS

| | | | | |
|---|---|---|---|---|
| 1,481,015 A * | 1/1924 | Klein | A47G 33/1206 248/524 |
| 3,641,335 A * | 2/1972 | Wall | G02B 6/0005 362/567 |
| 4,130,678 A * | 12/1978 | Higgins | A47G 33/06 428/9 |
| 4,331,720 A * | 5/1982 | Vin Dick | A47G 33/06 428/9 |
| 5,522,177 A * | 6/1996 | Davis | A47G 33/12 248/524 |
| 6,745,991 B1 * | 6/2004 | Rush | A47G 33/12 47/40.5 |
| 11,975,253 B2 * | 5/2024 | Jourdeans | A63B 69/0071 |
| 2010/0108851 A1 * | 5/2010 | Jordan | A47G 33/12 248/523 |
| 2015/0201783 A1 * | 7/2015 | Maneri | A47G 33/12 47/40.5 |

* cited by examiner

*Primary Examiner* — Bryon T Gyllstrom
(74) *Attorney, Agent, or Firm* — Brennan, Manna & Diamond, LLC

(57) ABSTRACT

A decorative light frame device used for accommodating and supporting decorative string lights to give a resemblance to, for example, a Christmas tree. The device includes a base ring and a base plate for support, a center post having at least two columns wherein the bottom column is attached to a tilting means such as a pivoting bar or a tapered pin for swiveling to stabilize the frame when the frame is positioned on a slope. A pair of arms attached to the base ring is fastened to the center post for supporting the post. A plurality of selectively sized and adjustable rings is detachably positioned on the post. A plurality of decorative lights are woven across the hooks of the rings to resemble, for example, a Christmas tree for decoration and illumination.

20 Claims, 17 Drawing Sheets

DECORATIVE LIGHT FRAME DEVICE

CROSS-REFERENCE TO RELATED APPLICATION

The present application is a Continuation-In-Part application and claims priority to and the benefit of U.S. application Ser. No. 18/523,998 which was filed on Nov. 30, 2023, and claims priority to and the benefit of U.S. Provisional Patent Application No. 63/464,661, which was filed on May 8, 2023, both of which are incorporated herein by reference in their entirety.

FIELD OF THE INVENTION

The present invention generally relates to the field of Christmas trees. More specifically, the present invention relates to a novel Christmas lights frame device designed to receive Christmas lights and resemble a conventional artificial Christmas tree. The frame device can be placed on an uneven surface without fear of tilting or slipping over. The device has a plurality of rings positioned on a post for giving a conical shape to the frame to resemble an outline of a Christmas tree when lights are woven across hooks of the frame device. Accordingly, the present disclosure makes specific reference thereto. Nonetheless, it is to be appreciated that aspects of the present invention are also equally applicable to other like applications, devices, and methods of manufacture.

BACKGROUND

By way of background, people love to celebrate holidays and festival season by decorating their homes, business places and outdoors. The most common and celebrated tradition in enjoying holidays is setting up and adorning a Christmas tree. A Christmas tree brings joy and festive spirit to the household during the holiday season. The Christmas tree is adorned with ornaments, garlands, and tinsel, enhancing its appearance, and adding to the festive atmosphere of the house. Christmas lights are also an integral part of tree decoration. Lights can be LEDs or any other conventional lights and contribute to the visual appeal, particularly when illuminated at night. In conventional artificial Christmas trees, lights are commonly wrapped around the outer branches and cover the surface perimeter of the tree and are not evenly distributed throughout its interior. Further, the lights can be entangled in the branches which results in an untidy look.

Traditional artificial Christmas trees are constructed with an affixed frame made of rigid materials like metal or plastic. The frame lacks customization options and cannot be easily modified to meet the requirements of different users. Another limitation of conventional artificial Christmas trees is their inability to be placed stably on sloped surfaces. The rigid frame of the tree does not allow for tilting or adjustment to maintain balance on uneven terrains. This makes it difficult for people who have non-planar yards with slopes to position a tree securely in such areas. Conventional artificial Christmas trees are difficult to store and carry. Many of the components of the tree device are not detachable and cannot be disassembled. People desire an improved Christmas light frame device that can overcome the problems associated with conventional artificial Christmas trees.

Therefore, there exists a long felt need in the art for an improved Christmas light frame device. There is also a long felt need in the art for a Christmas light frame device that enables a user to hang Christmas lights such that the lights resemble a Christmas tree around the frame. Additionally, there is a long felt need in the art for a novel Christmas light frame device that can disassembled for easy transport and storage. Moreover, there is a long felt need in the art for a Christmas light frame device that can be used on any type of flat or sloped surface for decoration purposes. Further, there is a long felt need in the art of a Christmas light frame device that does not have branches and a rigid and non-collapsing structure. Finally, there is a long felt need in the art for a Christmas light frame device that can be used for removably attaching LED lights for resembling a Christmas tree and can be placed in indoor and outdoor settings, and upon any type of surface.

The subject matter disclosed and claimed herein, in one embodiment thereof, comprises a Christmas lights frame device. The frame device is designed to resemble a conventional artificial Christmas tree that can be placed on any uneven surface. The frame includes a base ring, a base plate positioned diametrically in the base ring, a sliding attachment fastened to a T-shaped member disposed on the center of the base plate, the sliding attachment has a pivotable cylindrical member on the top surface thereof, a base column coupled to the pivotable member enabling the base column to swivel along the movement of the pivotable member, the base column forms a portion of the center post of the frame device, wherein a center post is formed by coupling the base column and a top column. The center post is supported by a pair of arms secured to the base column using a column slip collar, the pair of arms extend from opposing points of the base ring and are fastened to the column slip collar. A plurality of different size rings is detachably attached to the center post, each ring has a plurality of hooks, a plurality of Christmas lights is woven through the hooks and extend from the top of the center post to the bottom ring of the plurality of the rings for providing a holiday Christmas light display.

The ring positioned near the top of the post is the smallest in diameter and the ring positioned near the bottom of the post is the largest in diameter, thereby giving a conical shape to the frame device.

In this manner, the Christmas light frame device of the present invention accomplishes all of the forgoing objectives and provides users with a frame device that can be decorated with Christmas lights to resemble a Christmas tree. The frame has a center post that can be tilted enabling the light frame device to stand vertically on a slope. The frame device has detachable components enabling a user to disassemble the frame for easy transportation and storage.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a Christmas lights frame device. The frame device further comprising a base ring, a base plate positioned diametrically in the base ring, a sliding attachment fastened to a T-shaped member disposed on the center of the base plate, the sliding attachment has a pivotable member on the top surface thereof, a base column coupled to the pivotable member enabling the base column to swivel along the movement of the pivotable member, the base column forms a portion of the center post of the frame device, wherein a center post is formed by coupling the base column and a top column, the center post is supported by a pair of arms secured to the base column using a column slip collar, the pair of arms extend from opposing points of the base ring and move upwards and inwards to fasten to the column slip collar. A plurality of different size rings are detachably attached to the center post, each ring has a plurality of hooks, a plurality of Christmas lights are woven through the hooks and extend from the top of the center post to the bottom ring of the plurality of the rings for providing holiday Christmas light display.

In yet another embodiment, a Christmas frame device for supporting Christmas string lights is disclosed. The frame has a central post pivotally positioned on a base plate, the base plate extends between two opposing points of a base ring, a plurality of different size rings are attached to the central post along the length thereof, the ring positioned near the top of the central post has the smallest diameter and the ring positioned closest to the base ring has the largest diameter, wherein each ring has a plurality of hooks. Christmas lights are extended from the top of the central post to the bottom ring wherein the lights are woven across the hooks of the rings in different patterns to resemble a Christmas tree.

In yet another embodiment, a Christmas lights frame device that resembles and functions as a Christmas tree is disclosed. The frame device includes a circular base ring, a base plate permanently attached to the base ring, a pin (i.e., tapered or straight) positioned at the center of the base plate, a column coupled to the pin, the pin is configured to tilt from 90 degrees to 30 degrees relative to the base plate, at least three rings are detachably attached to the column wherein the ring attached closest to the top of the column has the smallest diameter and the ring attached closest to the base ring has the largest diameter, each ring has a plurality of hooks along the surface thereof which can be a permanent part of each ring, or the plurality of hooks can be attached to each ring and re-positioned along each hoop for providing a resemblance to a Christmas tree. The pin enables the column to be tilted enabling the frame device to be placed on a slope.

In yet another embodiment, each ring can come in a plurality of symmetrical portions or arcs, wherein each component is fastened to at least one other component on the opposing ends thereof.

In yet another embodiment, the frame device has a bubble leveling module for enabling the column to be positioned vertically.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
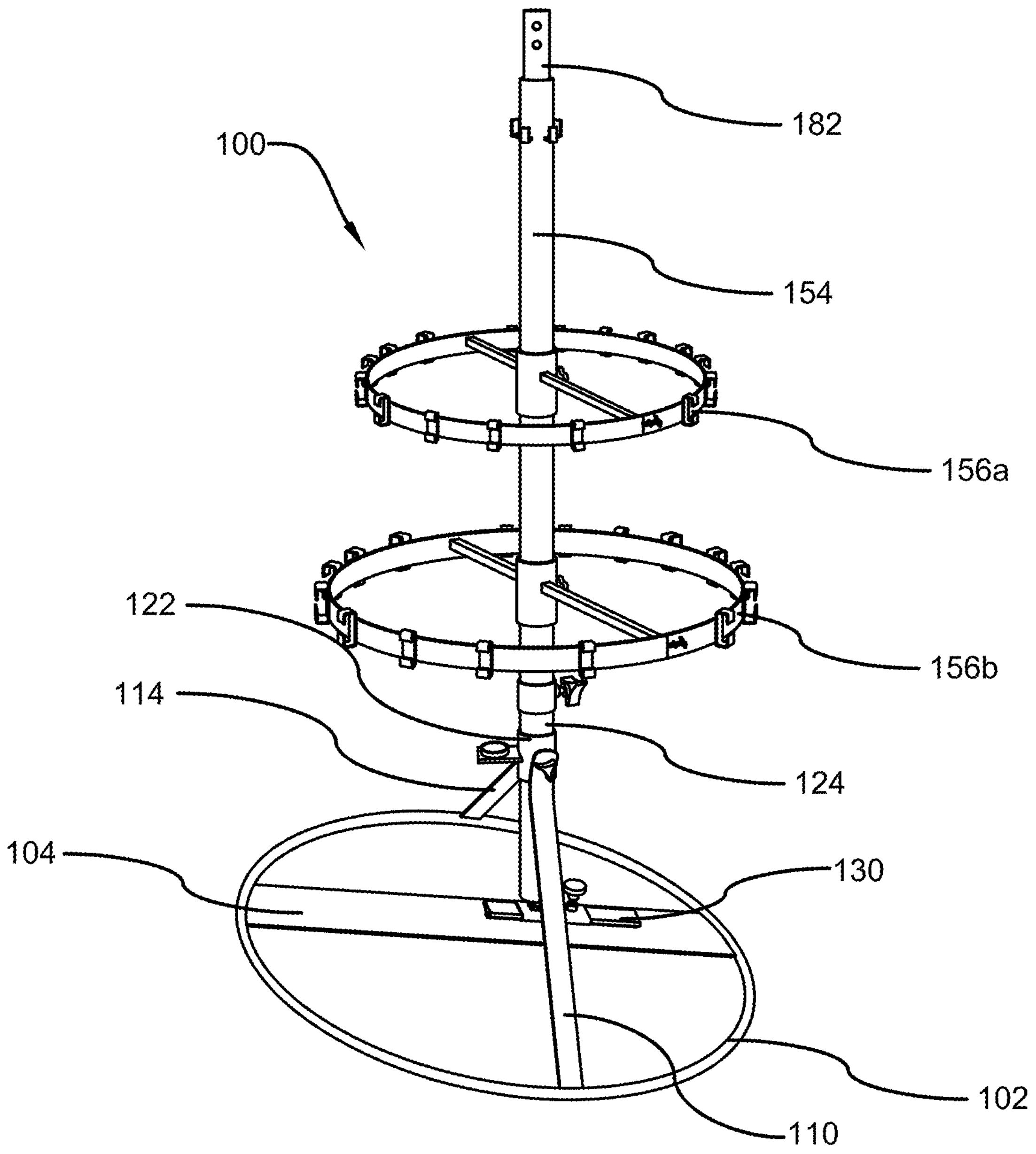
FIG. 1 illustrates a perspective view of the Christmas light frame device of the present invention in accordance with the disclosed structure.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for an improved Christmas light frame device. There is also a long felt need in the art for a Christmas light frame device that enables a user to hang Christmas lights such that the lights resemble a Christmas tree around the frame. Additionally, there is a long felt need in the art for a novel Christmas light frame device that can disassembled for easy transport and storage. Moreover, there is a long felt need in the art for a Christmas light frame device that can be used on any type of flat or sloped surface for decoration purposes. Further, there is a long felt need in the art of a Christmas light frame device that does not have branches and includes a rigid and non-collapsing structure. Finally, there is a long felt need in the art for a Christmas light frame device that can be used for removably attaching LED lights for resembling a Christmas tree and can be placed at indoors and outdoors on any type of surface.

The present invention, in one exemplary embodiment, is a Christmas lights frame device that resembles and functions as a Christmas tree. The frame device includes a circular base ring, a base plate permanently attached to the base ring, a pin (i.e., tapered or straight) positioned at the center of the base plate, a column coupled to the straight pin, the pin is configured to tilt from 90 degrees to 30 degrees relative to the base plate, at least three rings are detachably attached to the column wherein the ring attached closest to the top of the column has the smallest diameter and the ring attached closest to the base ring has the largest diameter, each ring has a plurality of hooks along the surface thereof, a plurality of Christmas lights are woven across the rings and are supported by the hooks for providing a resemblance to a Christmas tree. The pin enables the column to be tilted enabling the frame device to be placed or stood vertically on a slope.

Figure 2:
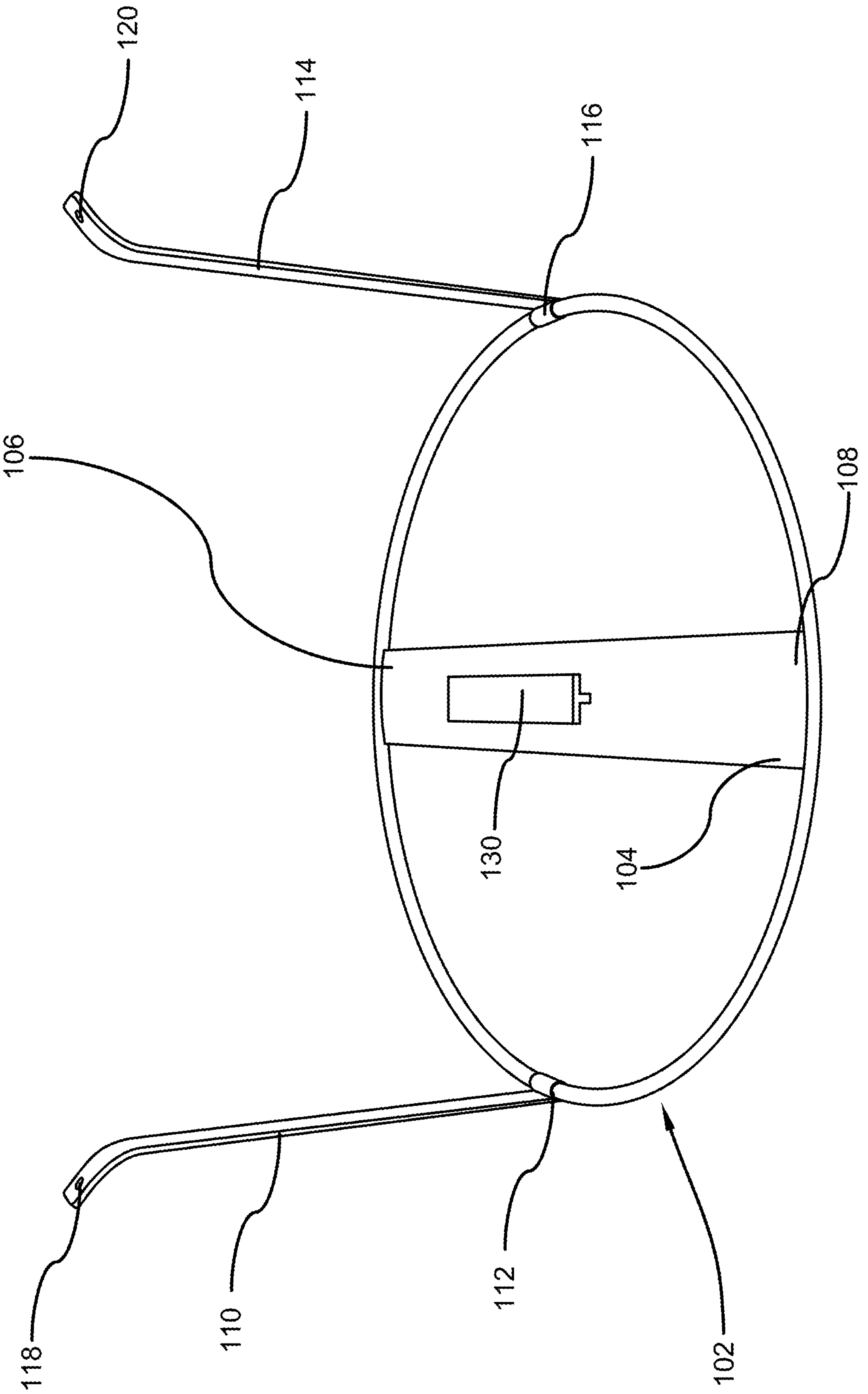
FIG. 2 illustrates an isolated view of the base ring and base plate with associated arm used in the Christmas light frame device of the present invention in accordance with the disclosed structure.

Referring initially to the drawings, FIG. 1 illustrates a perspective view of the Christmas light frame device of the present invention in accordance with the disclosed structure. The Christmas light frame device 100 of the present invention is designed as a modular frame designed to hold string lights and other decorative items for an effective and aesthetic outdoor and/or indoor holiday light display. The frame device 100 can be adjusted to different sizes and can be positioned on any substantially flat, sloped, or inclined surface. More specifically, the Christmas light frame device 100 includes a substantially circular base ring 102 that preferably has a diameter from about 12 inches to about 36 inches and can be made from ⅜" diameter round stock. A base plate 104 extends through the middle of the base ring 102 and is welded to the base ring 102 on the opposing ends 106, 108 of the base plate 104 as illustrated in FIG. 2. The base plate 104 can be made of a heavy metal for providing support and stability to the light frame device 100.

Referring to FIGS. 1 and 2, a first arm 110 is welded to a first collar 112 which is configured to pivot on the circular base ring 102. Similarly, a second arm 114 is welded to a second collar 116 which is also configured to pivot on the circular base ring 102. Each individual arm is a substantially flat bar that includes a corresponding hole at the top end thereof. As illustrated, the first arm 110 includes the hole 118 and the second arm 114 includes the hole 120. The arms 110, 114 are fastened to a column slip collar 122 positioned on a base or vertical column 124. The arms 110, 114 help in holding the base column 124 in place without any side-to-side swivel or movement.

Figure 3:
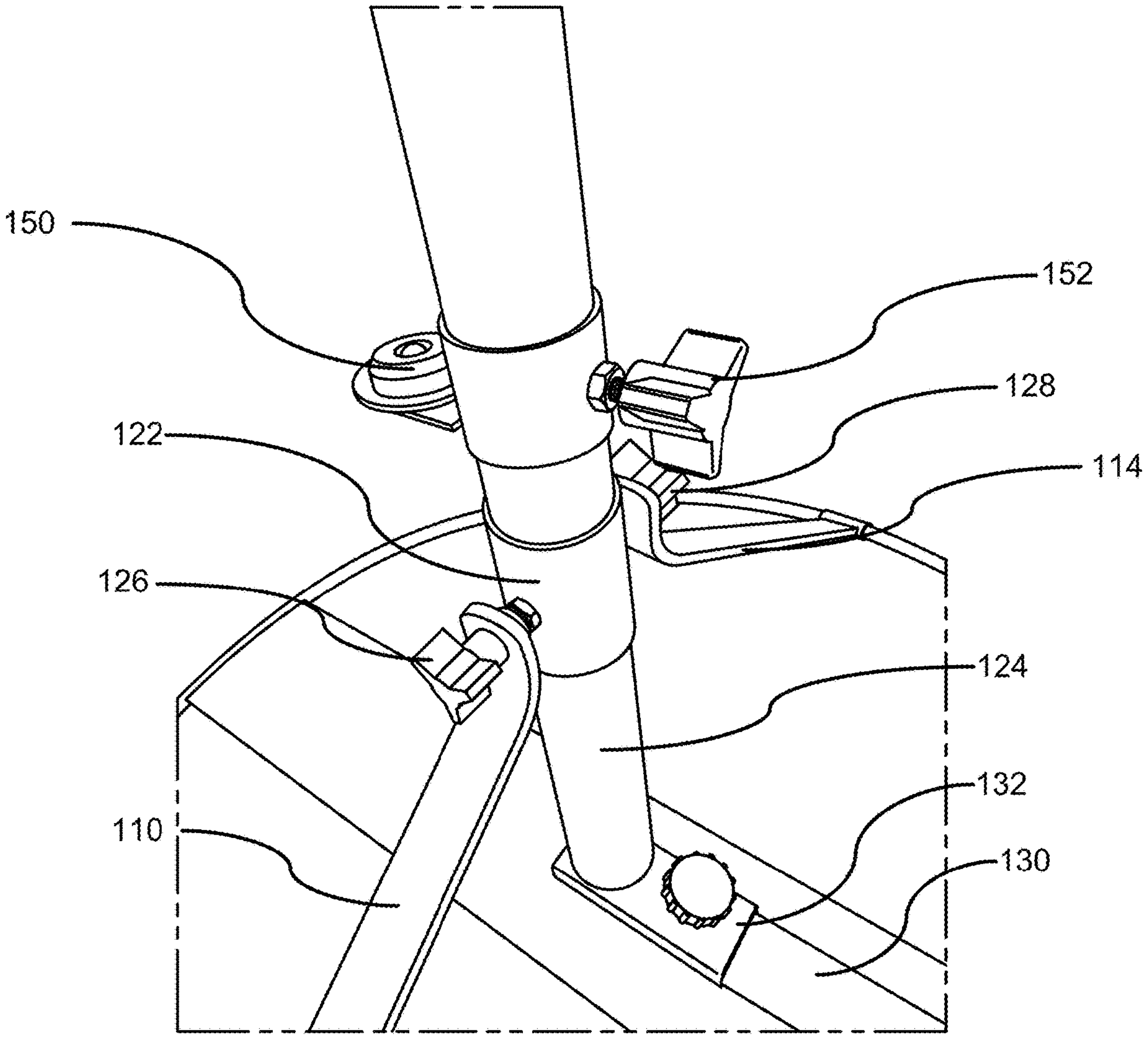
FIG. 3 illustrates an enlarged view of the fastening of the arms to support the column of the frame device in accordance with the disclosed structure.

Referring to FIG. 3, the first arm 110 is fastened to the column slip collar 122 using a first fastener 126. The first fastener 126 can be any mechanical fastener such as a threaded screw. Similarly, the second arm 114 is fastened by fastening the second arm 114 to the column slip collar 122 using a second fastener 128. The column slip collar 122, in some of the embodiments, can be affixed and cannot be repositioned or slid along the base column 124. In other embodiments, the column slip collar 122 can slide along a length of the base column 124.

Figure 4:
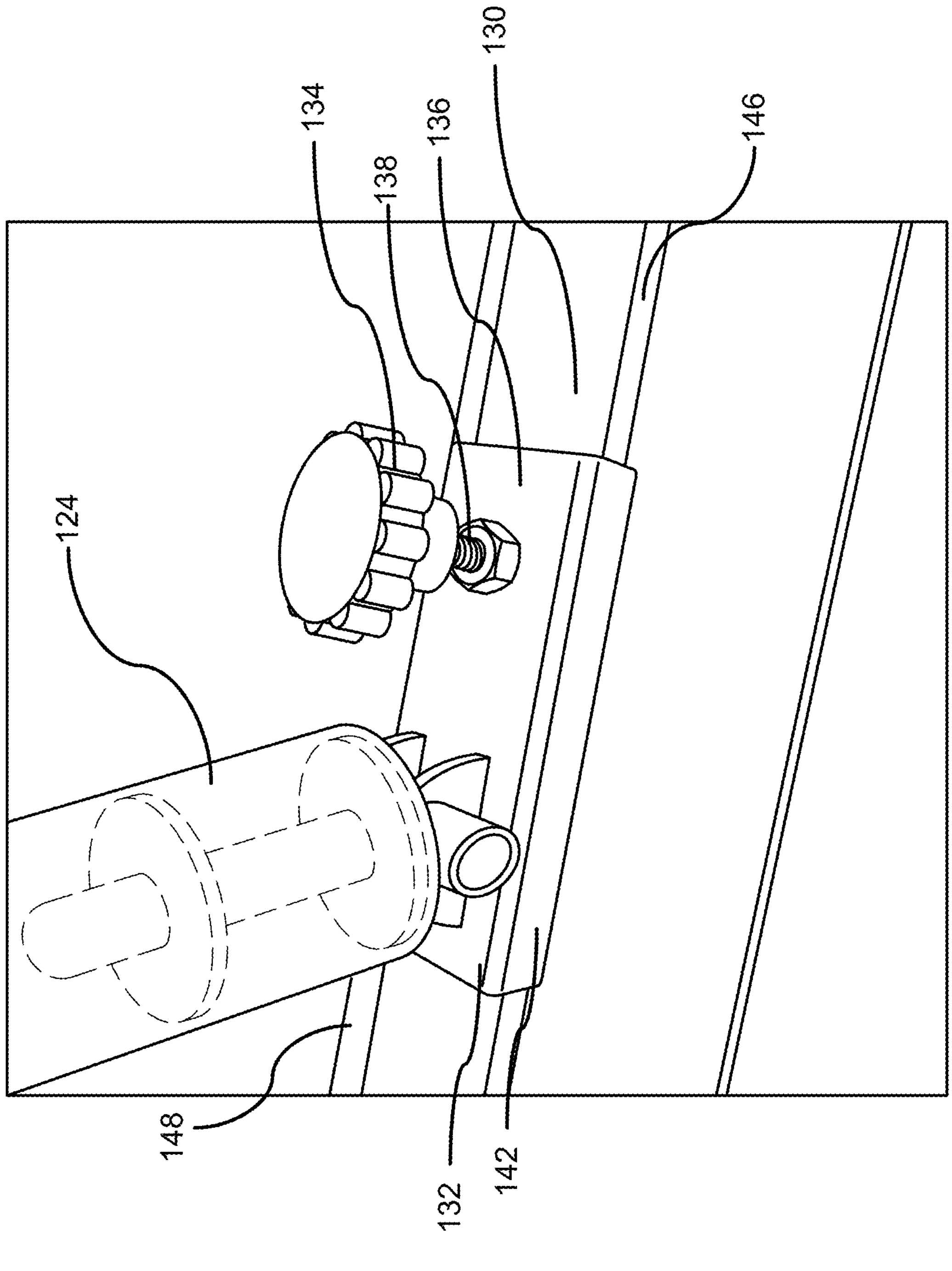
FIG. 4 illustrates the sliding attachment attached to the T-shaped member in accordance with the disclosed structure.

Again, referring to FIGS. 1, 2 and 3, a T-shaped member 130 is welded to the base plate 104. The T-shaped member 130 is generally rectangular, has a width of about ⅕ of the width of the base plate 104 and is welded preferably around the middle of the base plate 104. A sliding attachment 132 as illustrated in FIGS. 3 and 4, is detachably positioned on the T-shaped member 130 and is configured to slide along the T-shaped member 130. A tightening knob 134 is positioned on the top surface 136 of the sliding attachment 132 which when rotated in one direction abuts against the T-shaped member 130 to releasably affix the sliding attachment on the T-shaped member 130. The tightening knob 134 includes a threaded screw 138 whose free end abuts against the T-shaped member 130.

A cylindrical pivoting bar 140 is permanently attached to the straight pin (thereby forming a "T" shaped piece) and held in place on the sliding attachment 132 by two collars affixed (i.e., welded) to the surface 136, one on each side which allow the pivoting bar to rotate relative to the length of the sliding attachment 132. The swivel movement of the cylindrical pivoting bar 140 is restricted towards the knob 134, thereby preventing the cylindrical pivoting bar 140 from touching the knob 134, thereby preventing interference with the movement of the knob 134. The straight pin with attached cylindrical bar 140 is configured to receive the base column 124, thereby enabling the base column 124 to swivel and orient in a vertical position even when the base ring 102 is positioned on a tapered, sloped, or non-flat surface.

Figure 5:
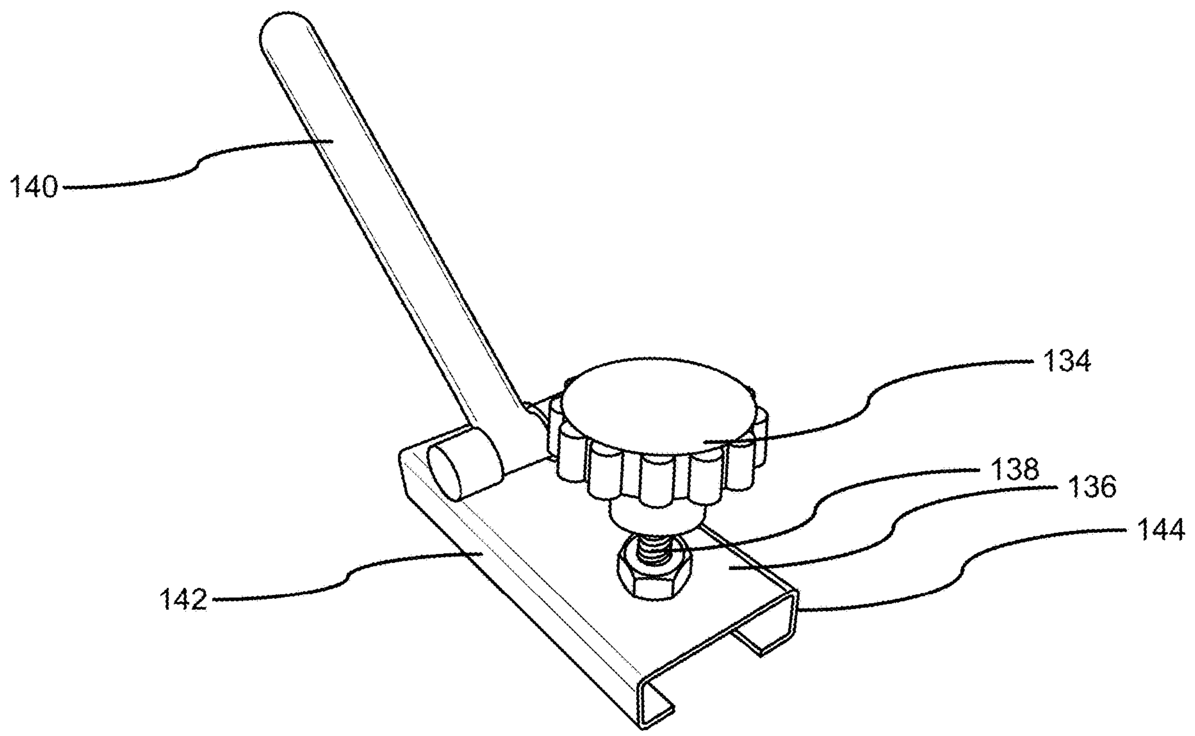
FIG. 5 illustrates an isolated view of the sliding attachment in accordance with the disclosed structure.

Referring to FIGS. 4 and 5, the sliding attachment 132 has two L-shaped legs 142, 144 extending vertically downwards from the top surface 136 of the sliding attachment 132. The L-shaped legs 142, 144 conform to opposing edges 146, 148 of the T-shaped member 130 for securing and sliding the sliding attachment 132 along the T-shaped member 130.

Referring back to FIG. 3, the Christmas light frame device 100 has a slidable and repositionable leveling bubble component 150 used to level or orient the Christmas light frame device 100 to a vertical orientation. The bubble component 150 can slide and can be removed by unfastening the screw fastener 152.

Figure 6:
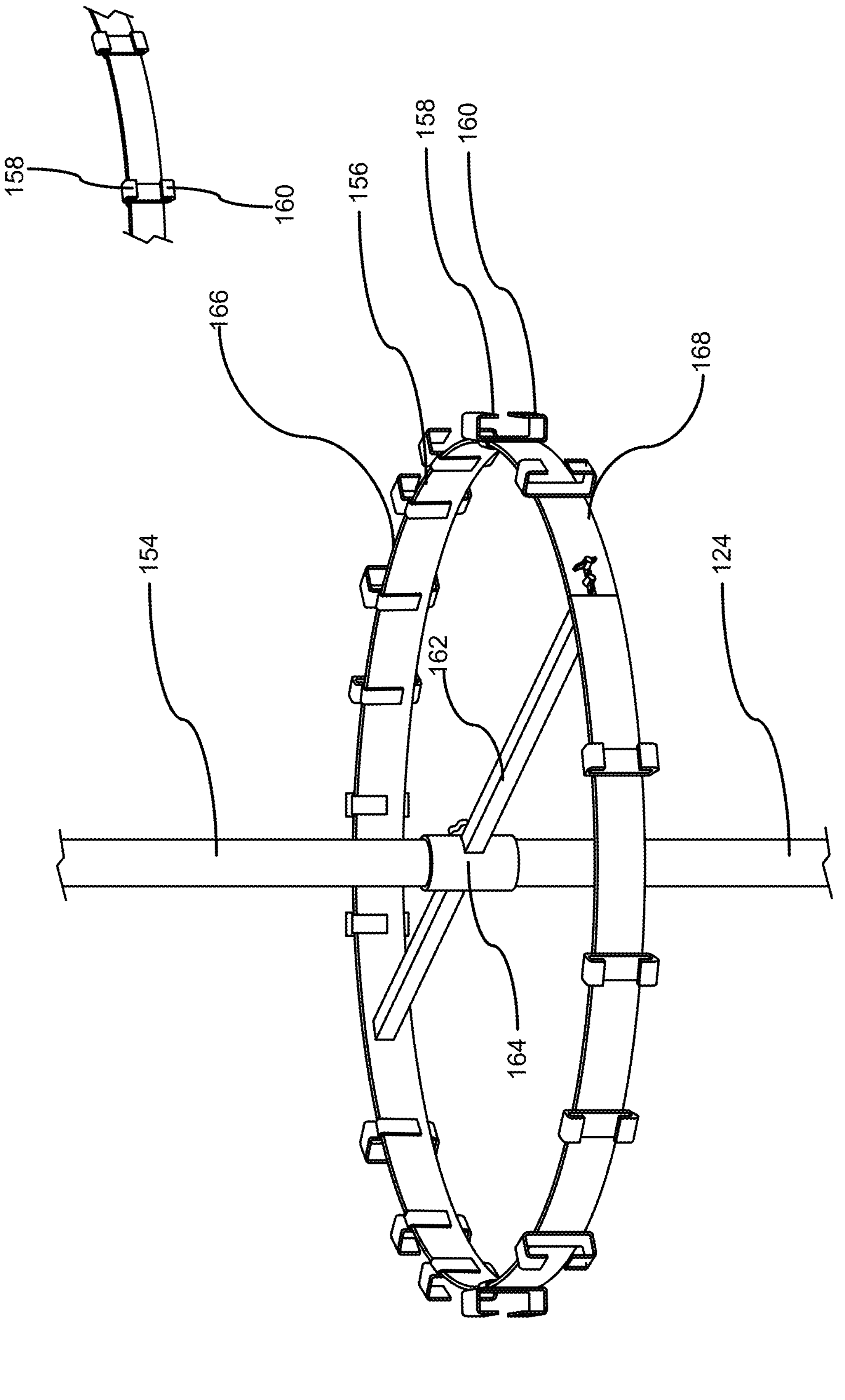
FIG. 6 illustrates an enlarged view of a repositionable ring detachably attached to the central column of the Christmas lighting tree frame of the present invention in accordance with the disclosed structure.

FIG. 6 illustrates an enlarged view of a repositionable ring detachably attached to the central column of the Christmas lighting tree frame of the present invention in accordance with the disclosed structure. Referring to FIGS. 1 and 6, the frame device 100 includes a plurality of different size repositionable rings 156*a-n* (hereinafter referred to as 156) for supporting Christmas string lights. The ring 156 is shown as an exemplary ring and it should be noted that any number of rings of same or different diameters can be attached to the center post of the frame 100 as illustrated in FIG. 1. The ring 156 is positioned at the junction of the base column 124 and the top column 154 and further has a supporting member 162 positioned along diametrically opposing ends of the ring 156. The ring 156 can be secured at any appropriate position along the center post using a set screw to screw the fastener 164.

Figure 8:
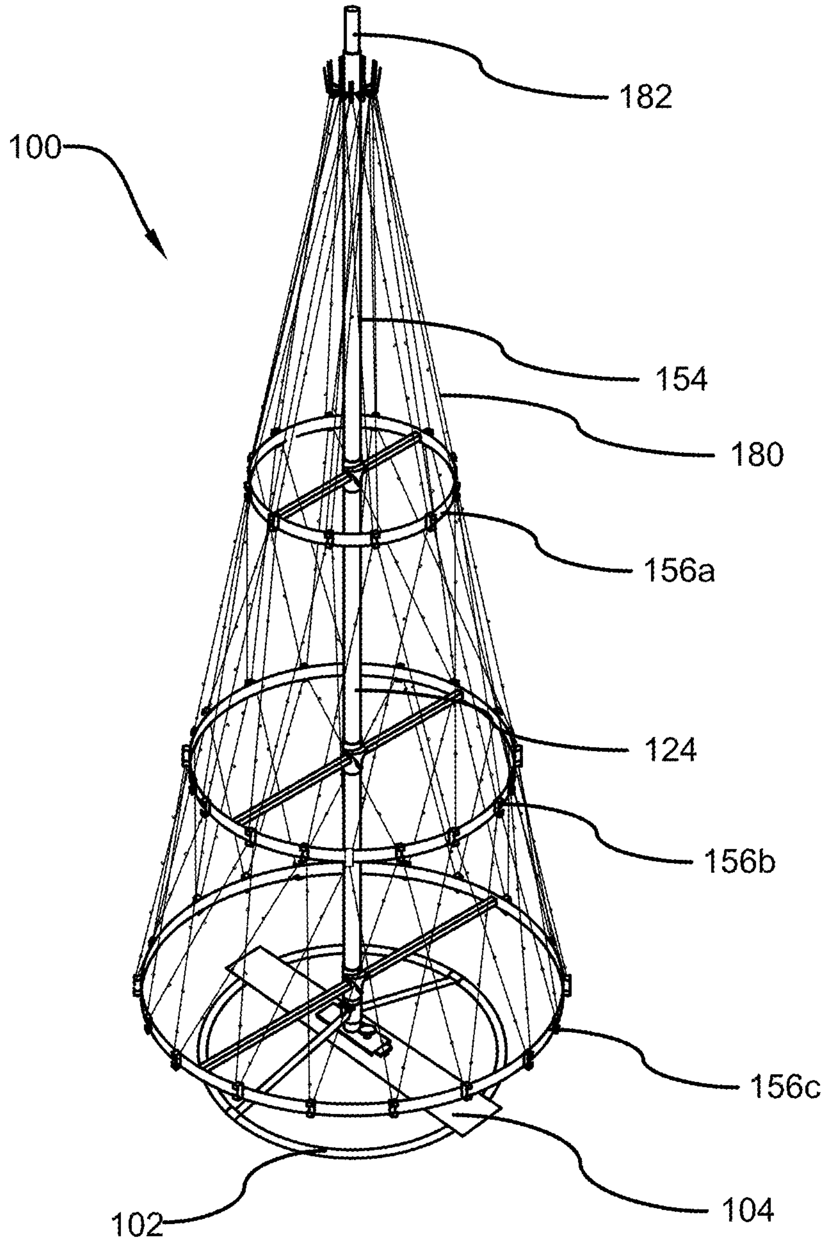
FIG. 8 illustrates a perspective view of the Christmas light tree device of the present invention with the lights detachably woven in the rings for creating an outdoor lighting in accordance with the disclosed structure.

The ring 156 can have a plurality of upper hooks 158 which can be cut and bent from the top edge 166 of the ring 156. Similarly, a plurality of lower hooks 160 can be cut and bent upwards from the bottom edge 168 of the ring 156. Similarly, the hooks 158, 160 can be formed as detachable clips which can be positioned along the top edge 166 and the bottom edge 168 of the ring 156. As illustrated in FIG. 8, the hooks 158, 160 are used for supporting Christmas string lights wherein the lights can be woven along the hooks of different rings in different patterns for creating decorative lighting.

Figure 7:
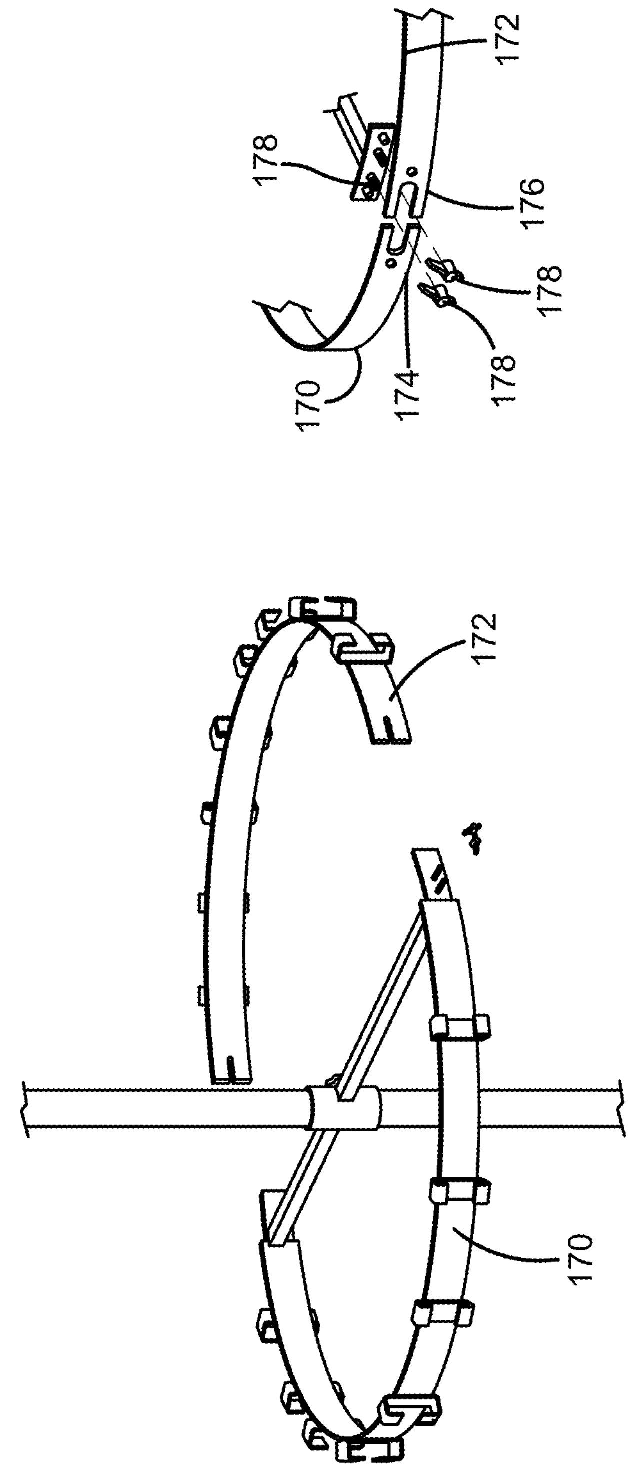
FIG. 7 illustrates an exploded view of the exemplary ring used in the Christmas light frame of the present invention in accordance with the disclosed structure.

FIG. 7 illustrates an exploded view of the exemplary ring 156 used in the Christmas light frame of the present invention in accordance with the disclosed structure. Rings used in the tree frame 100 of the present invention can include different components or arcs and can be secured to each other for installation in the tree frame 100. The rings can come in 2 to 4 parts for easy packaging and storage. In the present embodiment, the ring 156 comes in two parts and combining the individual components 170, 172 is performed by joining the opposing end 174 of the first component 170 and the end 176 of the other component 172 using fasteners such screw and bolts 178. The free ends of the components 170, 172 are combined in the same way for forming the circular ring 156 to secure on the center post as illustrated in FIG. 6.

FIG. 8 illustrates a perspective view of the Christmas light tree device of the present invention with the lights detachably woven in the rings for creating an outdoor lighting in accordance with the disclosed structure. As illustrated, a plurality of Christmas lights 180 which can be in the form of flexible LED strips of multiple colors are woven and arranged in different forms and patterns along the hooks 158, 160 of different rings 156. The lights 180 can be easily removed from the Christmas light frame device 100 when not required to be used such as while disassembling the Christmas light frame device 100 or when replacing the light with a new light. The lights 180 can be illuminated using any conventional external power supply and the Christmas tree light device 100 can be placed indoors and outdoors on any type of surface. The top of the Christmas light frame device 100 is capped with a slip-on piece 182 that enables a user to attach a decorative item such as a star or any other item for aesthetic purposes.

Figure 9:
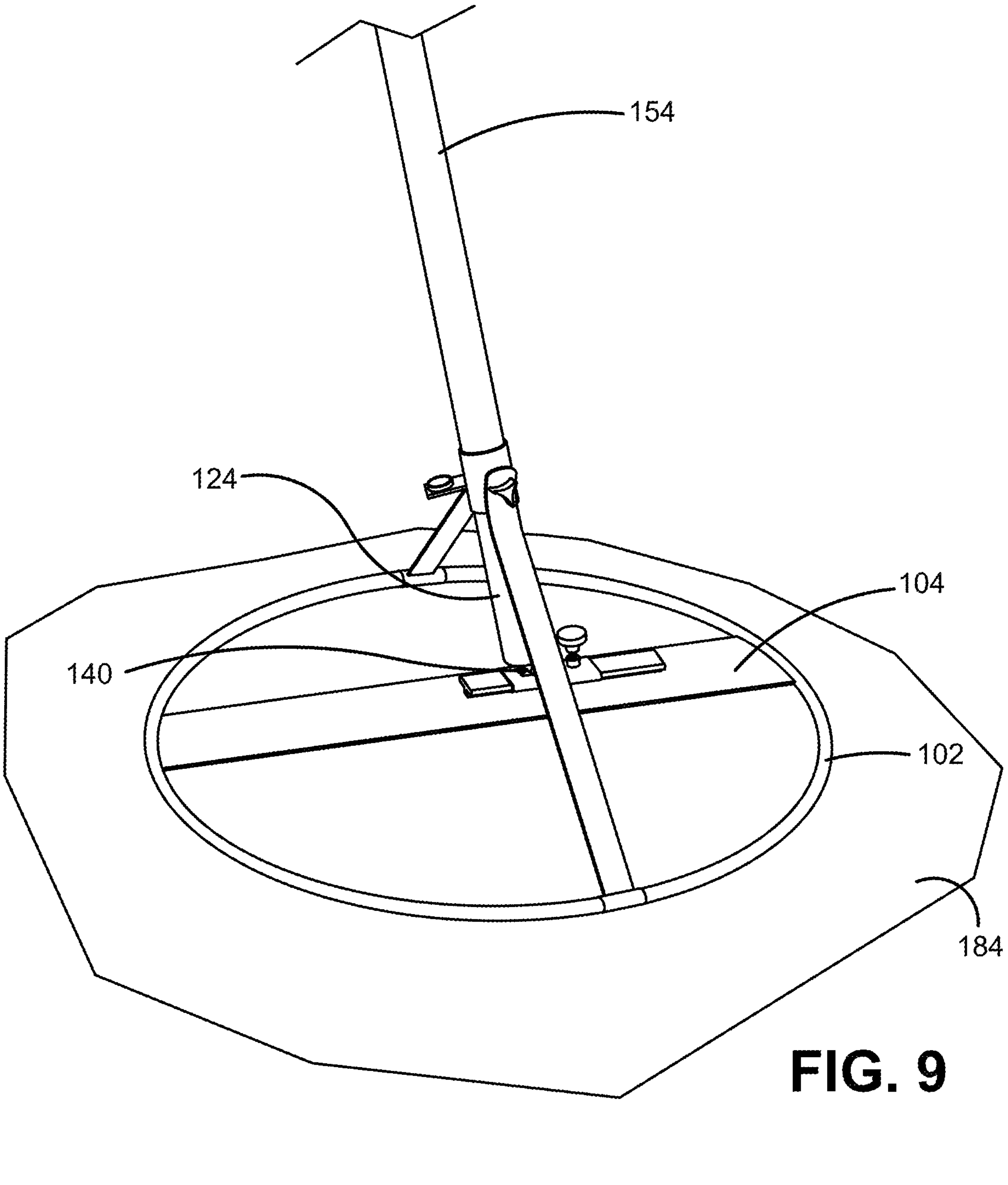
FIG. 9 illustrates a partial perspective view showing the sliding base ring enabling the tree frame to be placed safely on a sloping ground in accordance with the disclosed structure.

FIG. 9 illustrates a partial perspective view showing the sliding base ring enabling the tree frame to be placed safely on a sloping ground surface in accordance with the disclosed structure. In the present embodiment, the base ring 102 can be positioned on a sloped surface 184 such that the base plate 104 is parallel to the slope 184 for providing a stable support to the tree frame 100. Ballast (i.e., weights or sand bags) or stakes can be placed on top of, or over, the base ring 102 to further anchor the base ring 102 to the ground surface. Further, for preventing the tree frame 100 from falling or tilting, the center pole (formed of the poles or columns 124, 154) is tilted up to 45-degrees using the cylindrical pivoting bar 140. The tilt of the column using the cylindrical pivoting bar 140 enables the frame 100 to be placed on the sloping ground 184.

Figure 10:
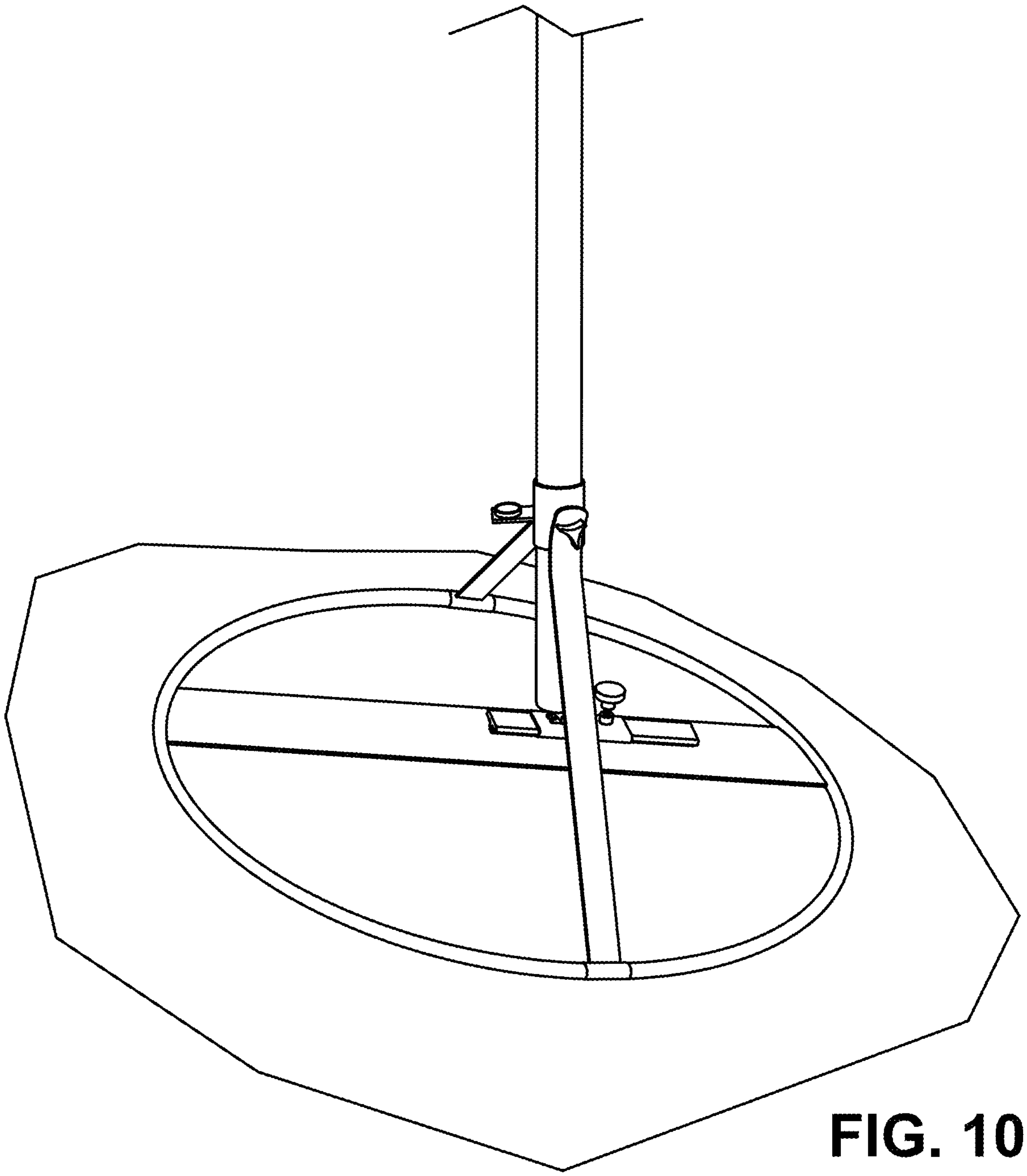
FIG. 10 illustrates a partial perspective view showing the tree frame placed on a sloping ground with the column in a substantially vertical position in accordance with the disclosed structure.

FIG. 10 illustrates a partial perspective view showing the tree frame placed on a sloping ground surface with the column in a substantially vertical position in accordance with the disclosed structure. Using the cylindrical pivoting bar 140, the column can be positioned vertically upwards for providing a stable position to the tree frame 100 without any tilting thereof.

Figure 11:
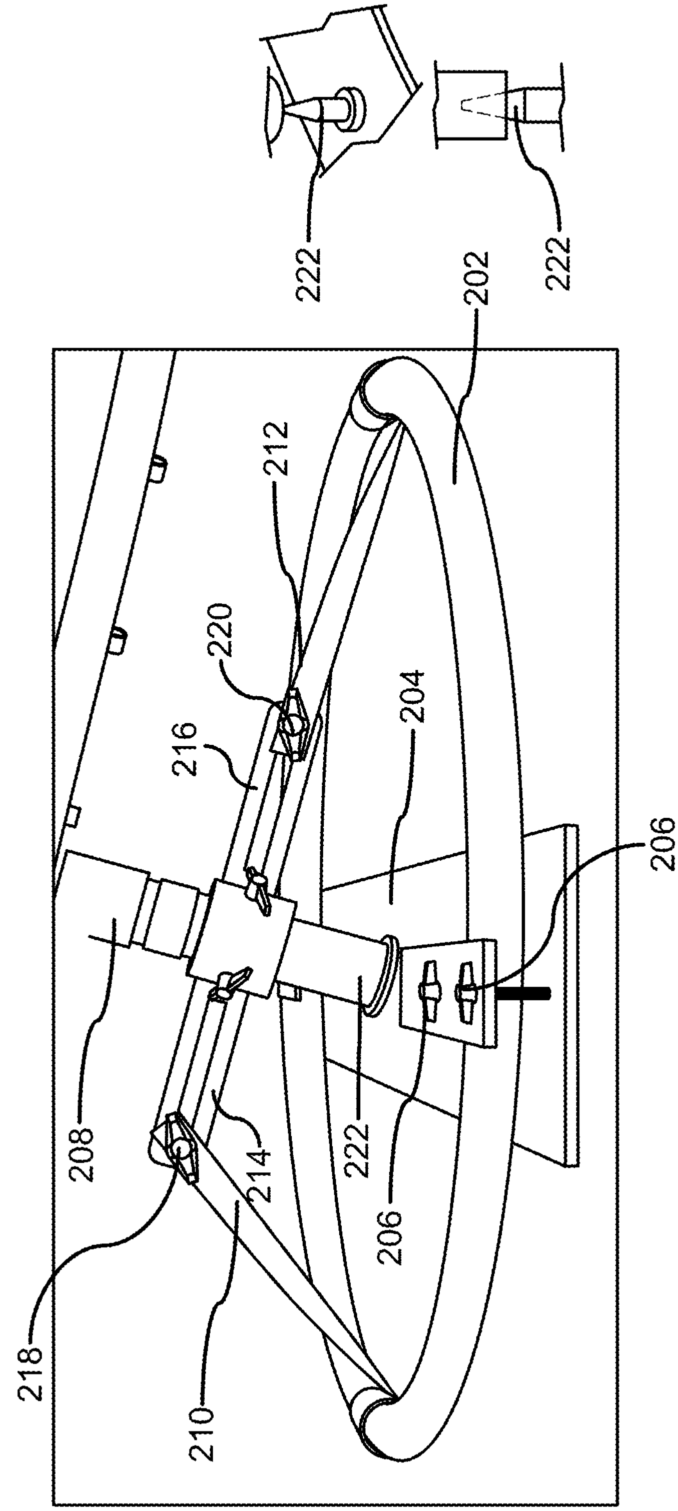
FIG. 11 illustrates another embodiment of the base plate and the arms used for securing the column of the tree frame in accordance with the disclosed structure.

FIG. 11 illustrates another embodiment of the base plate and the arms used for securing the column of the tree frame 100 in accordance with the disclosed structure. In the present embodiment, the base plate 204 is detachably connected to the base ring 202 using mechanical screw fasteners 206. The screw fasteners 206 are used at opposing ends of the base plate 204 for integrating the base ring 202 and the base plate 204. For providing support to the column 208, a pair of opposing arms 210, 212 are releasably attached to the column 208 by fastening in the opposing loops 214, 216. The arm 210 is fastened to the loop 214 using a first fastener 218 and the opposing arm 212 is fastened to the loop 216 using a second fastener 220.

For tilting and swiveling the column 208, a tapered pin 222 on the base plate 204 is positioned and fitted into the bottom of the column 208. The tapered pin 222 is configured to tilt the column 208 at different angles. The different rings having hooks as described earlier in the disclosure can be attached to the column 208 using any type of conventional fastener.

An advantage of the present embodiment is that the base plate 204 can be adjusted along the base ring 202 for enabling the tree 200 to stand vertically even on an inclined surface.

Figure 12:
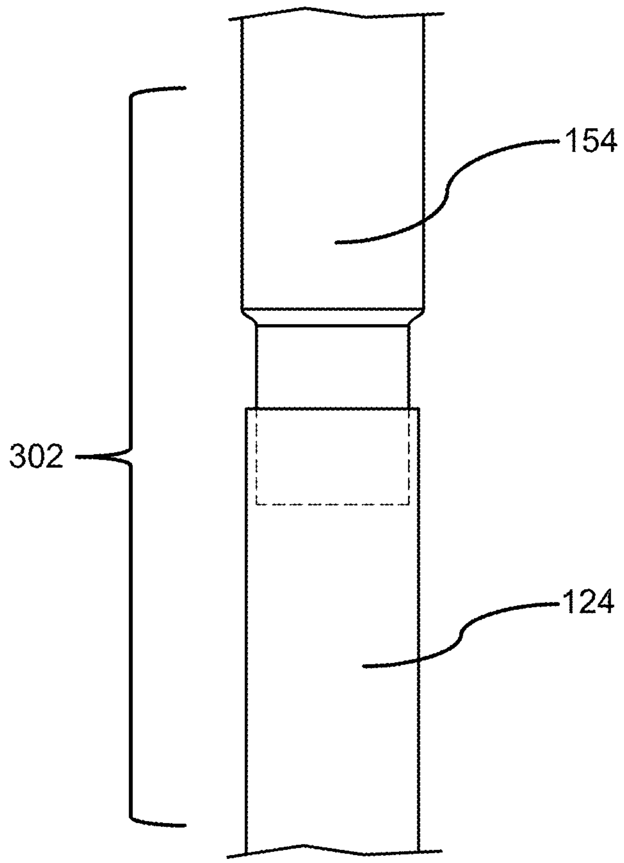
FIG. 12 illustrates an enlarged view of the center post or center pole used in the Christmas tree frame device of the present invention in accordance with the disclosed structure.

FIG. 12 illustrates an enlarged view of the center post or pole used in the Christmas tree frame device of the present invention in accordance with the disclosed structure. The base column 124 and the components of the top column 154 snugly fits into each other and can be telescopically fastened to each other for a secure connection and for forming the center post 302 used in different embodiments of the present invention.

Figure 13:
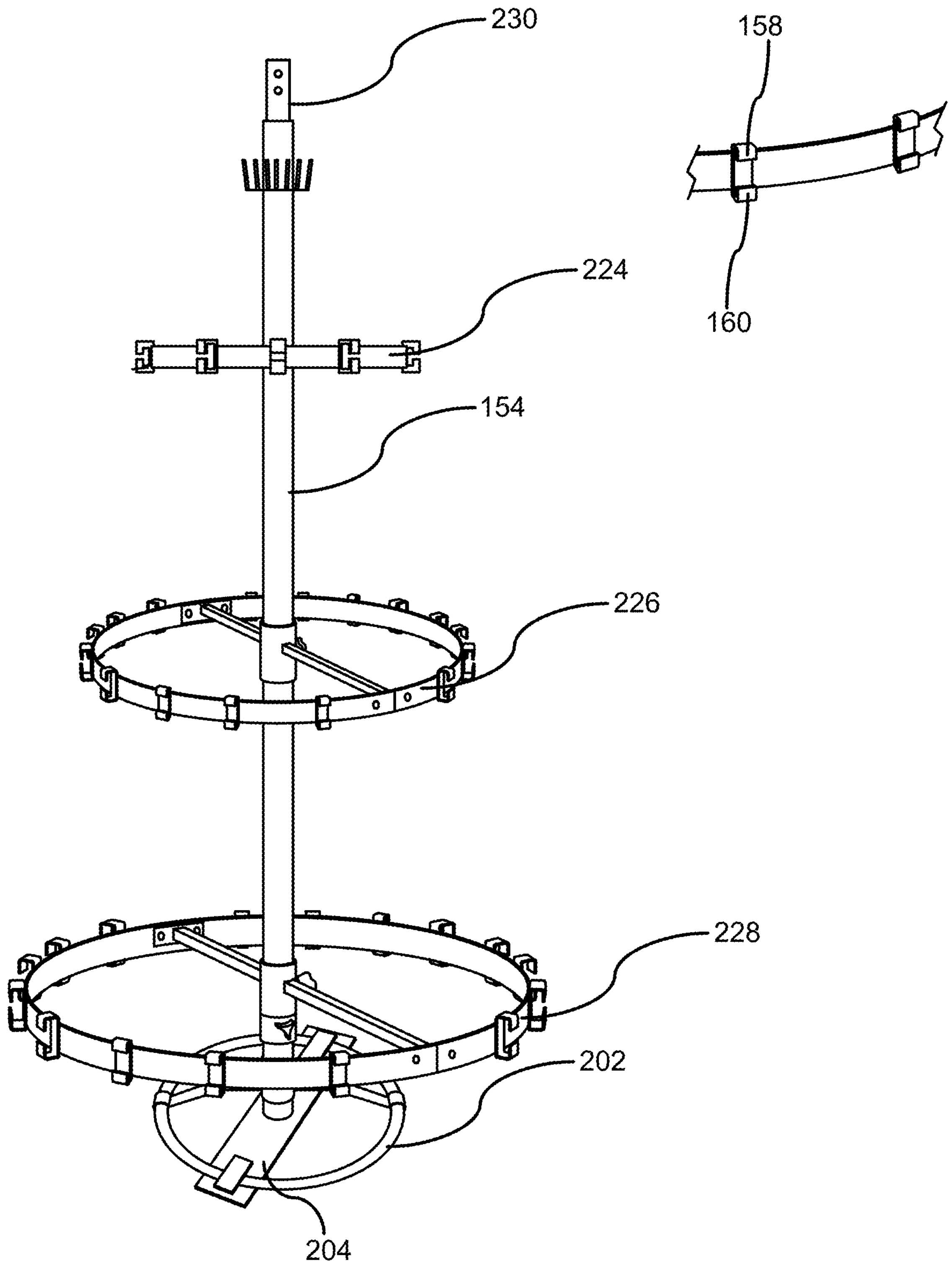
FIG. 13 illustrates a perspective view showing the Christmas tree frame standing upright in an assembled form in accordance with the disclosed structure.

FIG. 13 illustrates a perspective view showing the Christmas tree frame 200 standing upright in an assembled form in accordance with the disclosed structure. A plurality of repositionable rings 224, 226, 228 are positioned on the center column 302 and are secured as illustrated in FIGS. 6 and 7. Further, the bottom ring 228 can come in four identical arcs which can be combined together as illustrated in FIG. 7 using fasteners. The frame 200 is kept on a floor surface using the base ring 202 and is supported by the base plate 204.

Figure 14:
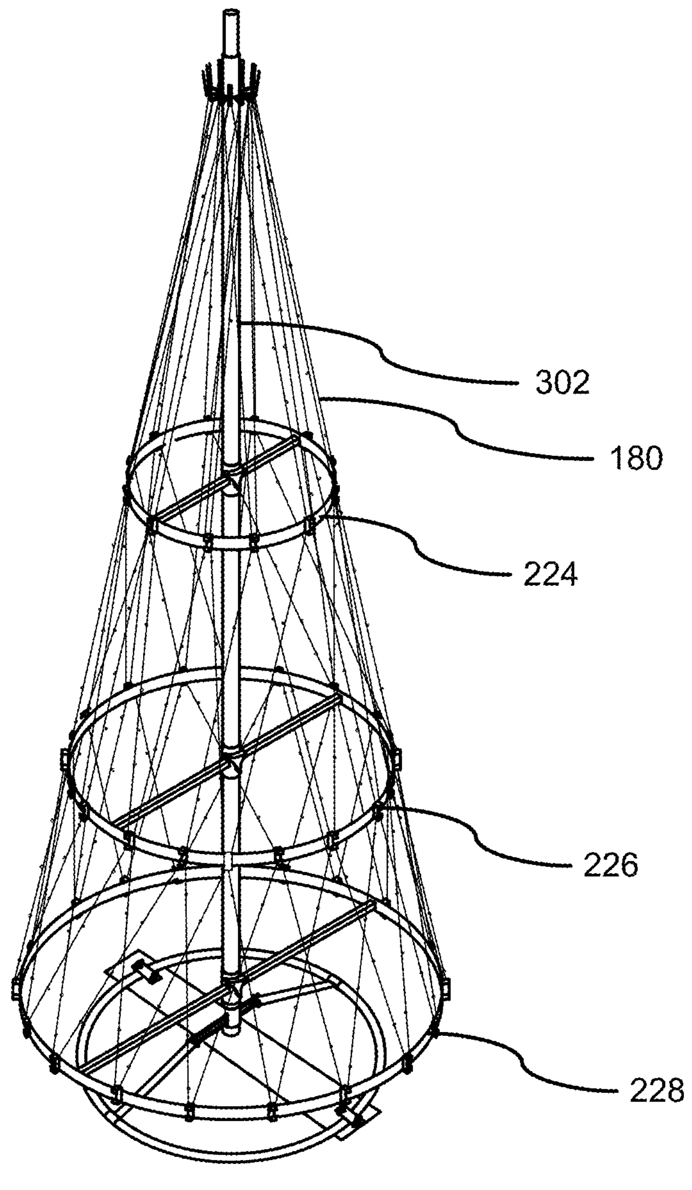
FIG. 14 illustrates a perspective view of the Christmas light tree device of the present invention with the lights detachably woven in the rings for creating an outdoor lighting in accordance with the disclosed structure.

Further, the rings 224, 226, 228 have hooks 158, 160 as illustrated in FIGS. 6 and 13. The Christmas tree lights 180 are installed on the frame 200 extending from the top end 230 to the bottom ring 228 with each section formed by rings 156 acting independently from other sections for the purpose of forming a varying light display and secured to each ring by use of hooks 158, 160, or by detachable clips and secured using the hooks 158, 160 as illustrated in FIG. 14. The hooks are coated in rubber and can be made of the same material as of the rings for preventing damage to the electric wires of the light 180. Alternatively, the hooks 158, 160 can be injection molded.

Figure 15:
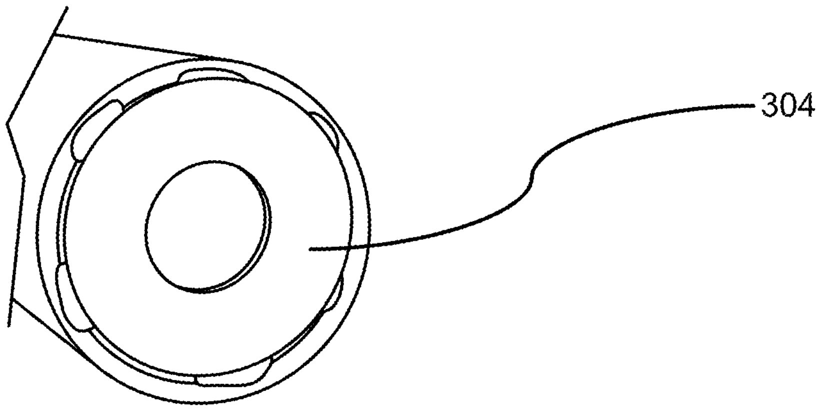
FIG. 15 illustrates an exemplary washer welded into the base column for a secure arrangement with the cylindrical pivoting bar or the tapered pin in accordance with the disclosed structure.

FIG. 15 illustrates an exemplary set of washers inserted into the bottom of the base or vertical column 124, the bottom washer being affixed to the bottom of the base or vertical column 124 for a secure arrangement with the cylindrical pivoting bar 140 which is attached to the pin 222 (i.e., straight pin) thereby being enabled to pivot along the length of the base plate 204 through the use of two collars, one on each side of the pivoting bar 140, the collars having been permanently attached to the top surface 136 of the sliding mechanism 132. The washers are spaced approximately 2 inches apart and affixed (i.e., welded) together by attaching a tube of slightly larger inside diameter than the pin 222 between the two washers, the washer arrangement then being inserted into the bottom of the base or vertical column 124 and affixed (i.e., welded) in place. The base or vertical column 124 can then be inserted onto the straight pin 222 which extends through the washers and tube for a pivotal and secure attachment.

Figure 16:
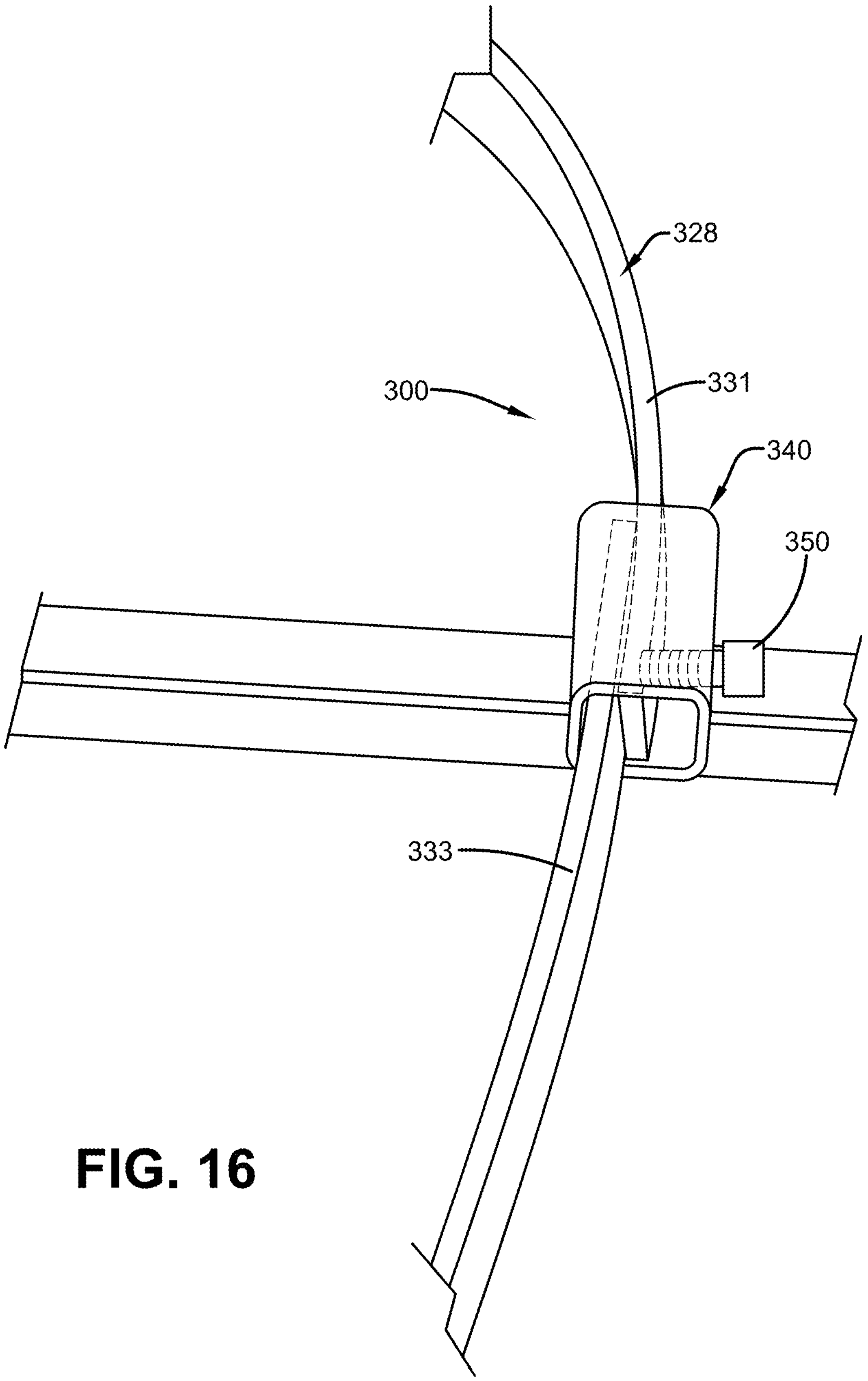
FIG. 16 illustrates an enlarged view of yet still another embodiment of a repositionable and selectively sizable ring detachably attached to the central column of the lighting tree frame of the present invention in accordance with the disclosed structure.
Figure 17:
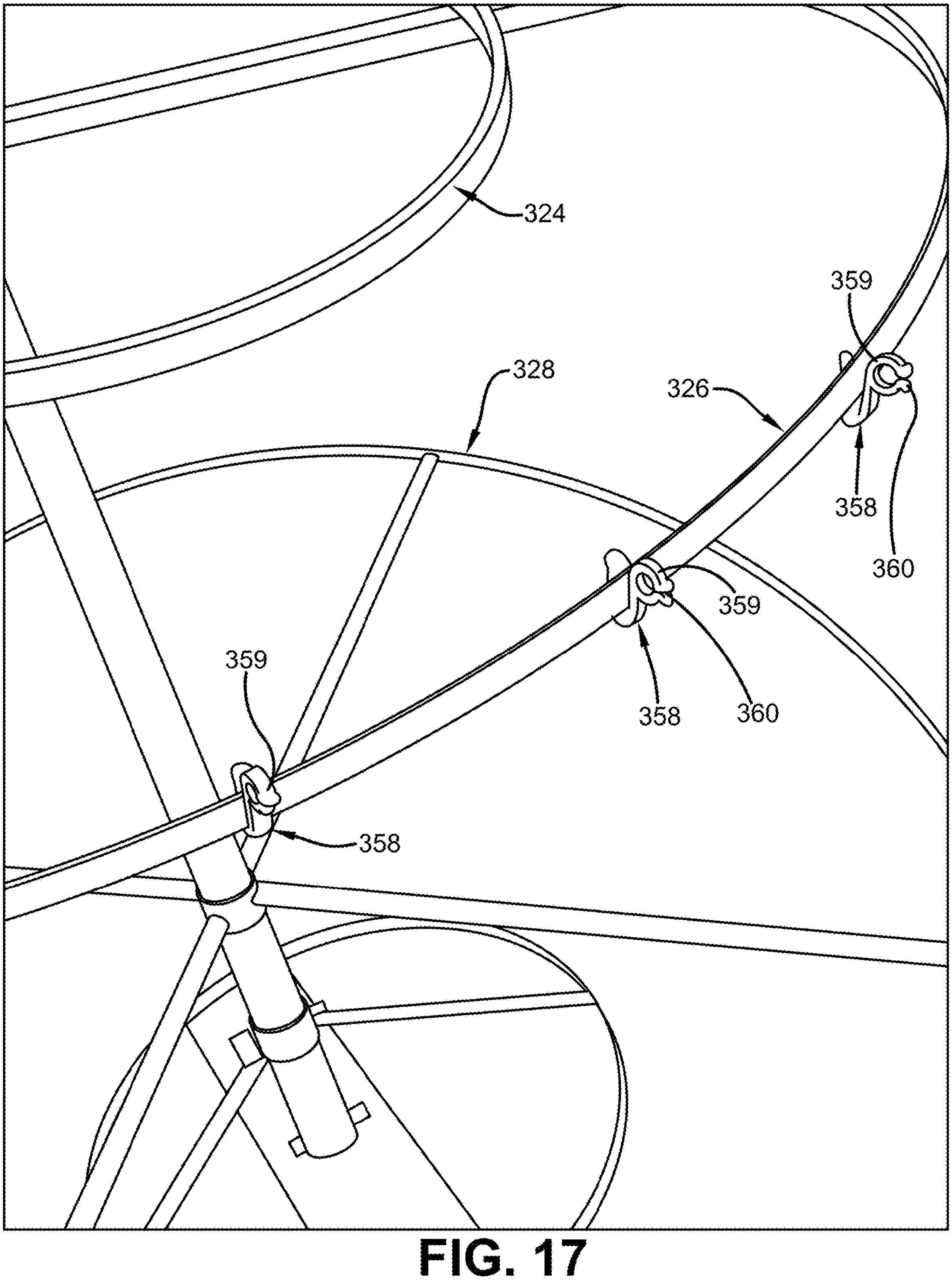
FIG. 17 illustrates a perspective view of the yet still another embodiment (FIG. 16) of the repositionable and selectively sizable ring detachably attached to the central column of the lighting tree frame and another embodiment of retention clips of the present invention in accordance with the disclosed structure.

FIGS. 16 and 17 illustrate perspective views of another embodiment of a light frame 300 including selectively sizable rings 324, 326, and 328 used in the light frame 300 of the present invention in accordance with the disclosed structure. Rings 324, 326, 328 used in the light frame 300 of the present invention can include split rings 324, 326, 328 having ends that pass through slip rings. For example, split ring 328 includes ends 331, 333 that pass through a slip ring 340 for adjusting and selecting the circumference of the ring 328 and for securing the ring 328 with the tree frame 300. It is to be appreciated that the further the ends 331, 333 are passed through the slip ring 340, the smaller the selected resultant circumference of ring 328. The ends 331, 333 pass adjacently to each other through slip ring 340 and are retained by a securing retention screw 350. The retention screw 350 can be turned inward (i.e., clockwise) to secure (i.e., push) ends 331, 333 against or between the inside walls of slip ring 340.

The rings 324, 326, 328 can include a plurality of hooks or clips 358 which can be selectively secured to, and detached from, the rings 324, 326, 328 from a direction above (i.e., over) or below (i.e., under) the rings. The clips 358 are slidable along and around the rings 324, 326, 328 for securing and supporting string lights. The clips 358 include a loop or circumferential retainer 359 for holding the string lights. The retainer 359 includes a passage 360 for passing the light string therethrough.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "Christmas light frame device", "light frame device", "frame device", "Christmas tree light device", and "tree frame" are interchangeable and refer to the Christmas light frame device 100, 200, 300 of the present invention.

Notwithstanding the forgoing, the Christmas light frame device 100, 200, 300 of the present invention can be of any suitable size and configuration as is known in the art without affecting the overall concept of the invention, provided that it accomplishes the above stated objectives. One of ordinary skill in the art will appreciate that the Christmas light frame device 100, 200, 300 as shown in the FIGS. 1-14 are for illustrative purposes only, and that many other sizes and shapes of the Christmas light frame device 100, 200, 300 are well within the scope of the present disclosure. Although the dimensions of the Christmas light frame device 100, 200, 300 are important design parameters for user convenience, the Christmas light frame device 100, 200, 300 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A light frame device for supporting a plurality of lights, the light frame device comprising:

- a substantially circular base ring, a second circular ring, a third circular ring, a base plate extending across a middle section of said circular base ring, a base column, a first arm at a first end affixed to a first collar for pivoting on said circular base ring, a second arm affixed at a first end to a second collar for pivoting on said circular base ring, wherein said base plate is affixed at opposing ends to said circular base ring;
- wherein said first arm at a second end affixed to a column slip collar and said second arm at a second end affixed to said column slip collar, further wherein said first arm and said second arm support said base column in a selected orientation;
- wherein said column slip collar selectively pivotal around said base column;
- wherein said second circular ring and said third circular ring selectively repositionable up and down along said base column and a top column; and
- further wherein said circular base ring, said second circular ring, and said third circular ring are split rings for selectively adjusting a circumference of said circular base ring, said second circular ring, and said third circular ring.

2. The light frame device of claim 1, wherein said base column is positioned in the vertical orientation while said circular base ring is positioned on a sloped surface.

3. The light frame device of claim 1, wherein said base plate having a T-shaped member affixed to a top surface of said base plate;

- wherein said T-shaped member having a sliding attachment detachably positioned on said T-shaped member for sliding along said T-shaped member;

wherein said sliding attachment having a tightening knob positioned on a top surface of said sliding attachment to releasably affix said sliding attachment on said T-shaped member;

wherein said sliding attachment having a cylindrical pivoting bar pivotally coupled to said sliding attachment and configured to swivel along a length of said sliding attachment; and further wherein said cylindrical pivoting bar configured to receive said base column for positioning and swiveling said base column in a vertical orientation.

4. The light frame device of claim 3, wherein said tightening knob having a threaded screw with a free end selectively abutting against said T-shaped member.

5. The light frame device of claim 4, wherein said T-shaped member having a generally rectangular configuration including a width of about ⅕ of a width of said base plate.

6. The light frame device of claim 3, wherein said sliding attachment having a pair of L-shaped legs extending vertically downwards from a top surface of said sliding attachment, and further wherein said pair of L-shaped legs conforming to opposing edges of said T-shaped member for securing and sliding said sliding attachment along said T-shaped member.

7. The light frame device of claim 1, wherein said circular base ring having a selective diameter from 12 inches to 36 inches.

8. The light frame device of claim 1, wherein said base plate having a material of metal for providing support and stability to said light frame device.

9. The light frame device of claim 1, wherein said column slip collar slidable up and down along a length of said base column.

10. The light frame device of claim 1, wherein said second circular ring having a selectable second diameter and said third circular ring having a selectable third diameter.

11. The light frame device of claim 10, wherein said second circular ring and said third circular ring each having a plurality of hooks selectively movable along said second circular ring and said third circular ring for supporting flexible light strings.

12. The light frame device of claim 11, wherein said hook having a retention loop including a passage for passing the light string therethrough.

13. A light frame device for supporting a plurality of lights, the light frame device comprising:

a substantially circular base ring including a first diameter, a base plate extending across a middle section of said circular base ring, a base column, a first arm at a first end affixed to a first collar for pivoting on said circular base ring, a second arm affixed at a first end to a second collar for pivoting on said circular base ring, wherein said base plate is affixed at opposing ends to said circular base ring;

wherein said first arm at a second end affixed to a column slip collar and said second arm at a second end affixed to said column slip collar, further wherein said first arm and said second arm support said base column in a selected orientation;

wherein said column slip collar selectively pivotal around said base column;

at least a second circular ring and a third circular ring selectively repositionable up and down along said base column;

wherein said second circular ring is a split ring including a pair of adjacent ends for selective retention in a slip ring for selecting a circumference of said second circular ring; and further wherein said third circular ring is another split ring including a pair of adjacent ends for selective retention in another slip ring for selecting a circumference of said third circular ring.

14. The light frame device of claim 13, wherein said base plate having a T-shaped member affixed to a top surface of said base plate;

wherein said T-shaped member having a sliding attachment detachably positioned on said T-shaped member for sliding along said T-shaped member;

wherein said sliding attachment having a tightening knob positioned on a top surface of said sliding attachment to releasably affix said sliding attachment on said T-shaped member;

wherein said sliding attachment having a cylindrical pivoting bar pivotally coupled to said sliding attachment and configured to swivel along a length of said sliding attachment;

wherein said cylindrical pivoting bar configured to receive said base column for positioning and swiveling said base column in a vertical orientation; and further wherein said base column having a leveling bubble attached thereto for indicating a vertical orientation of said base column.

15. The light frame device of claim 14, wherein said sliding attachment having a pair of L-shaped legs extending vertically downwards from a top surface of said sliding attachment, and further wherein said pair of L-shaped legs conforming to opposing edges of said T-shaped member for securing and sliding said sliding attachment along said T-shaped member.

16. The light frame device of claim 13, wherein said base column is positioned in the vertical orientation while said circular base ring is positioned on a sloped surface.

17. The light frame device of claim 13, wherein said column slip collar slidable up and down along a length of said base column and a top column.

18. The light frame device of claim 13, wherein said second circular ring and said third circular ring each having a plurality of hooks selectively movable along said second circular ring and said third circular ring for supporting portions of flexible light strings.

19. A light frame device for supporting a plurality of lights, the light frame device comprising:

a substantially circular base ring, a base plate extending across a middle section of said circular base ring, a base column, a pair of opposing arms releasably attached to said base column and fastened to a pair of opposing loops, a first arm fastened to a first loop with a first pivotable fastener and a second arm fastened to a second loop with a second pivotable fastener;

wherein said base column having at least a first slidable mount for selective movement within said first loop and said second loop;

at least a second circular ring and a third circular ring selectively repositionable up and down along said base column;

wherein said second circular ring is a split ring including a pair of adjacent ends for selective retention in a slip ring for selecting a circumference of said second circular ring; and further wherein said third circular ring is another split ring including a pair of adjacent ends for selective retention in another slip ring for selecting a circumference of said third circular ring.

20. The light frame device of claim 19, wherein said second circular ring and said third circular ring each having a plurality of hooks selectively movable along said second circular ring and said third circular ring for supporting portions of flexible light strings.

* * * * *